UNITED STATES PATENT OFFICE.

WILHELM HECHT, OF BERLIN, GERMANY.

METHOD OF PRESERVING DRIED PLANTS.

SPECIFICATION forming part of Letters Patent No. 584,355, dated June 15, 1897.

Application filed November 14, 1896. Serial No. 612,144. (No specimens.)

*To all whom it may concern:*

Be it known that I, WILHELM HECHT, a subject of the King of Prussia, Emperor of Germany, residing at Berlin, in the Kingdom of Prussia, German Empire, have made certain new and useful Improvements in Methods of Preparing Dried Plants, of which the following is a specification.

The subject of this invention is a new process for preparing plants or parts of same, leaves, branches, &c., for decorative so-called "Makart" bouquets and similar purposes, thus obtaining beautiful appearance in detail and general arrangement. While hitherto such objects were generally bronzed in order to obtain color and shade effects, which process gave them a lustrous appearance, the new process gives them an opaque, dead-finish tone, which lends itself easily to all shades.

The new process is as follows: Dry leaves, ferns, and similar objects are made supple in the usual way and then steeped, soaked, or covered with a solution which consists, in its essential component parts, of oil-varnish and a gluish matter. This is followed by a preliminary drying process, and the objects thus treated are then ready for coloring. The color is applied by spreading colored powder on the leaves, &c. Velvet powder or fine silk fiber is best adapted for the purpose. The operator can readily produce any composition of tones and colors or grade them by various powders and tints. A further drying process finishes the application and the coating remains insolubly attached to the surface of the objects.

I claim—

The improved process of preparing plants or parts of the same consisting in first making the plants supple, then treating them with a coating of oil-varnish and glue material, then partially drying, then applying colored powders, velvet powder or fine silk fibers to the plants and then giving the plant a final drying with the powder applied thereto, substantially as described.

In witness whereof I have hereunto set my hand in presence of two witnesses.

WILHELM HECHT.

Witnesses:
 MAURICE J. HAHLO,
 E. KELLER.